Figure 1:
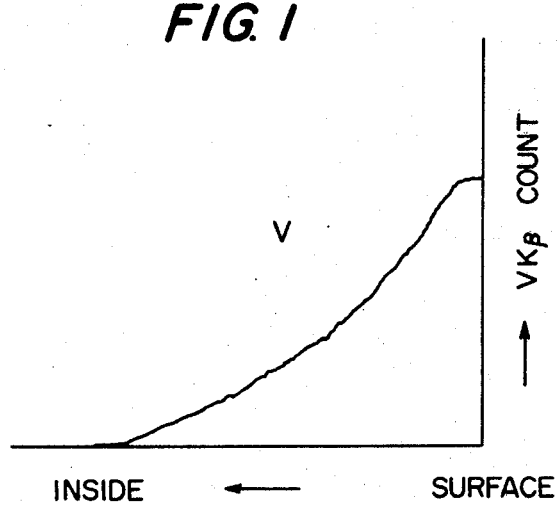

United States Patent [19]

Imanari et al.

[11] Patent Number: 4,466,947

[45] Date of Patent: Aug. 21, 1984

[54] DENITRATION CATALYST AND DENITRATING METHOD

[75] Inventors: Makoto Imanari; Bunzi Oshida, both of Ami; Yusaku Arima, Fukuoka; Hirokazu Tanaka, Kitakyushu; Yoshinori Todo; Norihisa Kobayashi, both of Nagasaki; Toshikuni Sera, Hiroshima, all of Japan

[73] Assignees: Mitsubishi Petrochemical Co. Ltd.; Catalysts & Chemicals Ind. Co. Ltd.; Mitsubishi Jukogyo Kabushiki Kaisha, all of Tokyo, Japan

[21] Appl. No.: 456,398

[22] Filed: Jan. 7, 1983

Related U.S. Application Data

[63] Continuation of Ser. No. 267,765, May 28, 1981, abandoned.

[30] Foreign Application Priority Data

May 31, 1980 [JP] Japan .................................. 55-72170

[51] Int. Cl.³ .......................... B01J 8/00; C01B 21/00
[52] U.S. Cl. .................................... 423/239; 423/244; 502/217; 502/309; 502/340
[58] Field of Search ..................... 423/239 A, 244 R; 502/309, 340, 217

[56] References Cited

U.S. PATENT DOCUMENTS

| | | | |
|---|---|---|---|
| 4,048,112 | 9/1977 | Matsushita et al. | 423/239 |
| 4,085,193 | 4/1978 | Nakajima et al. | 423/239 |
| 4,152,296 | 5/1979 | Okabe et al. | 252/461 |

FOREIGN PATENT DOCUMENTS

| | | | |
|---|---|---|---|
| 11093 | 1/1979 | Japan | 252/469 |
| 124886 | 9/1979 | Japan . | |

Primary Examiner—John Doll
Assistant Examiner—Wayne A. Langel
Attorney, Agent, or Firm—Sherman & Shalloway

[57] ABSTRACT

A denitration catalyst comprising at least three metal components, (A) titanium, (B) tungsten and/or magnesium, and (C) vanadium, the titanium and tungsten being contained as oxides and the magnesium and vanadium being contained in the form of an oxide or a sulfate or both, said catalyst being composed of a porous molded article of a mixture of an oxide of component A and an oxide and/or a sulfate of component B, the atomic ratio of component B to component A being from 0.01 to 1, and a vanadium compound localized in that area of said molded article which extends from its outermost surface to a depth of 500 microns or less, the content of the vanadium compound in said area being 0.1 to 15% by weight; and a method for removing nitrogen oxides from a waste gas, which comprises contacting a waste gas containing nitrogen oxides, together with ammonia and molecular oxygen, at a temperature of 150° to 650° C., with the aforesaid catalyst.

5 Claims, 2 Drawing Figures

DENITRATION CATALYST AND DENITRATING METHOD

This is a continuation of application Ser. No. 267,765, filed May 28, 1981, now abandoned.

This invention relates to a catalyst composition, and a denitrating (method for $NO_x$ removal) method, for effectively and economically reducing nitrogen oxides (to be abbreviated $NO_x$) contained in various waste gases such as combustion gases from heavy oil-burning boilers, coal-burning boilers, combustion furnaces annexed to various chemical apparatuses, steel-making plants, and combustion engines such as diesel engines or gas turbines, and thereby rendering them non-hazardous.

In particular, the present invention pertains to a catalyst composition which when applied to an exhaust gas containing not only $NO_x$ but also sulfur oxides (to be abbreviated $SO_x$) and soot and dust, i.e. possible catalyst poisons, to reduce $NO_x$ with ammonia ($NH_3$) as a reducing agent in the presence of molecular oxygen ($O_2$) at a suitable temperature, exhibits its function with good efficiency without being affected by the aforesaid poisoning components while greatly inhibiting the oxidation reaction of sulfur dioxide ($SO_2$) to sulfur trioxide ($SO_3$) which takes place simultaneously with the reduction of $NO_x$; and to a denitrating ($NO_x$ elimination) method using the aforesaid catalyst composition.

Methods for treating $NO_x$ in exhaust gases to render them non-hazardous include, for example, adsorption, oxidation-absorption, solidification, and catalytic reduction. The catalytic reducing method has been developed most extensively because it does not require any post-treatment and is economically and technically advantageous.

By the selection of a reducing agent, the catalytic reducing method can be classified into two types, but a selective catalytic reducing method using ammonia as a reducing agent is advantageous.

The aforesaid exhaust gases usually contain oxygen, carbon dioxide, carbon monoxide, water, nitrogen and various sulfur oxides in addition to nitrogen oxides such as NO and $NO_2$, and sometimes also contain halogen compounds and hydrocarbons. They might also contain high-boiling oil mists, heavy metals, and dusts. It has been desired therefore to develop a catalyst having durability which can convert small amounts of nitrogen oxides selectively and efficiently to non-toxic molecular nitrogen.

Among the above components, $SO_x$ and dusts possibly affect the catalyst most adversely.

$SO_2$ which is the largest in amount among $SO_x$ is converted to $SO_3$ by oxidation on the denitrating catalyst. $SO_3$, in turn, readily combines with the unreacted portion of ammonium used as a reducing agent at low temperatures to form acidic ammonium sulfate and other compounds which will block up various devices such as a heat exchanger after the removal of $NO_x$. Since this leads to the necessity of increasing the ability of the dust collector, the oxidation reaction of $SO_2$ must be inhibited.

Desirably, the denitrating catalyst exhibits high performance over a board temperature range.

Another requirement is that the denitrating catalyst should have heat resistance. In most of situations where oxidation of $SO_2$ causes a problem, the reaction temperature is more than 350° C. At a temperature of 350° C. or lower, the activity of the catalyst is reduced by the acidic ammonium sulfate, ammonium sulfate, ammonium chloride, etc. which build up in the reaction system. Hence, in most cases, the temperature must be raised to scatter these compounds. During this catalyst regenerating operation, the catalyst frequently undergoes heat degradation and decreases in activity.

Many denitrating catalysts have been applied for a patent heretofore. Among them, a catalyst containing titanium oxide and vanadium oxide (Japanese Laid-Open Patent Publication No. 128680/1975) has by far the highest activity and best durability to sulfur oxides and is thus known to be very feasible in practical application. Investigations of the present inventors however have shown that this catalyst system has inferior heat resistance, and when it is used for a long period of time at a reaction temperature of at least about 400° C. or is repeatedly subjected to a regeneration treatment at high temperatures, its activity is reduced. A catalyst composed of titanium oxide, vanadium oxide and tungsten oxide (Japanese Laid-Open Patent Publication No. 128681/1975) is improved in heat resistance, denitrating activity and durability to sulfur oxides, and is more feasible in practical application than the aforesaid titanium oxide/vanadium oxide catalyst. In a catalyst recently discovered by the present inventors (Japanese patent application Ser. No. 71102/1979) prepared by replacing tungsten oxide in the aforesaid catalyst partly or wholly by magnesium oxide and/or magnesium sulfate, the amount of expensive tungsten oxide can be reduced or its use is quite unnecessary. Moreover, it has equivalent heat resistance, denitrating activity and durability to sulfur oxides to the aforesaid catalyst. It is thus economically advantageous over the catalyst composed of titanium oxide, vanadium oxide and tungsten oxide. These catalysts, however, have still room for improvement because their activity in oxidation of $SO_2$ is slightly high.

Catalysts composed of a substrate of titanium oxide and vanadium oxide, and supported in a surface portion of the substrate, tungsten oxide (Japanese Laid-Open Patent Publications Nos. 124886/1979 and 3872/1980) contain a reduced amount of tungsten oxide, are highly active and have good durability to sulfur oxides. Moreover, their activity in oxidation of $SO_2$ can be considerably decreased. Since, however, these catalysts have slightly inferior heat resistance and slightly high activity in oxidation of $SO_2$, they have to be improved further.

The present inventors made extensive investigations in order to obtain a catalyst having better preformance. These investigations have led to the discovery that the aforesaid various requirements can be met by a denitration catalyst comprising at least three metal components, (A) titanium, (B) tungsten and/or magnesium and (C) vanadium, the titanium and tungsten being contained as oxides and the magnesium and vanadium being contained in the form of an oxide or a sulfate or both, said catalyst being composed of a porous molded article of a mixture of an oxide of component A and an oxide and/or a sulfate of component B, the atomic ratio of component B to component A being from 0.01 to 1, and a vanadium compound localized in that area of said molded article which extends from its outermost surface to a depth of 500 microns or less, the content of the vanadium compound in said area being 0.1 to 15% by weight.

FIG. 1 of the accompanying drawings shows the concentration distribution of vanadium (V) of the catalyst of the present invention, as determined by an X-ray microanalyzer.

Figure 2:
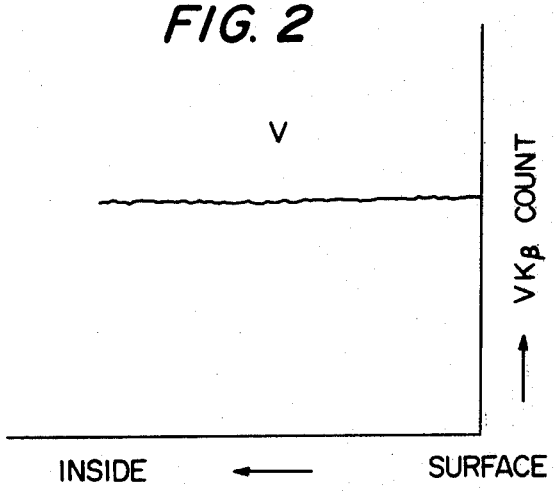

FIG. 2 shows the concentration distribution of vanadium (V) of a comparative catalyst, as determined by an X-ray microanalyzer.

Specifically, it was was found that a catalyst having high denitrating activity, low sulfur dioxide oxidizing ability, good durability to sulfur oxides and excellent heat resistance can be obtained by localizing a vanadium compound (an oxide and/or a sulfate of vanadium) in a very limited area near the surface of a porous molded article composed of a mixture, preferably an intimate mixture, of (a) titanium oxide and (b) at least one compound selected from the group consisting of tungsten oxide, magnesium oxide and magnesium sulfate.

The outermost surface of the aforesaid porous molded article which constitutes the catalyst of this invention does not mean the inside surfaces of micropores present on the surface of the molded article, but that surface of the molded article which covers micropores contacting the outermost surface of the molded article.

Generally, the catalyst of the invention can be prepared by the following method. First, a tungsten compound such as ammonium paratungstate and/or a magnesium compound such as magnesium nitrate, magnesium sulfate or basic magnesium carbonate or an aqueous or solvent solution thereof is added to a hydrate of titanium such as titanium hydroxide or metatitanate or a mixture thereof with titanium oxide. The mixture is heated while it is being well kneaded. Thus, the water is evaporated to form a cake. A suitable extruding aid or additive is added to the cake, and the mixture is extrusion-molded into a suitable form. The molded article is dried, and calcined to obtain a porous molded article of a mixture, preferably an intimate mixture, of titanium and tungsten and/or magnesium compound.

Other suitable examples of the tungsten compound are tungsten oxide and silicotungstic acid.

Suitable magnesium compounds include water-soluble or solvent-soluble magnesium compounds such as magnesium chloride, magnesium oxychloride, magnesium hydroxide and magnesium oxide, and magnesium compounds dispersible in fine particles in water or solvents. Similar tungsten compounds soluble or dispersible in water or solvents may be cited as examples of the tungsten compound.

Various methods are available to localize the vanadium compound in a specified area of the resulting molded article. Some preferred examples are shown below.

(1) The substrate (the aforesaid molded article), either as such or after being treated with an acid, is dipped for suitable period of time in a substantially neutral or basic solution of the vanadium compound (for example, an aqueous solution of ammonium metavanadate, or a solution of ammonium metavanadate in monoethanolamine or a mixture of it with water).

(2) The substrate is treated with aqueous ammonia or a water-soluble basic organic solvent such as monoethanolamine or morpholine, and is then dipped for a suitable period of time in a solution of vanadyl salt of an organic acid such as vanadyl oxalate or vanadyl citrate, or a solution of a vanadyl salt of a mineral acid such as vanadyl sulfate.

(3) The substrate is treated with a water-soluble organic solvent such as ethanol or acetone, and then dipped for a suitable period of time in a solution of the vanadium compound.

(4) The substrate is dipped for a suitable period of time in a highly viscous solution of the vanadium compound having a viscosity of at least 50 cp.

(5) The vanadium compound or its solution is sprayed in atomized form against the heated substrate.

(6) The substrate is coated with a slurry-like mixture of titanium, tungsten, vanadium and magnesium.

(7) The substrate is treated with a highly viscous solution having a viscosity of more than 50 cp which is water-soluble, and then dipped for a suitable period of time in a solution of the vanadium compound.

The molded article having the vanadium compound supported thereon by the methods (1) to (7) is then calcined at a temperature of, for example, 300° to 700° C., to activate it. Calcination, however, is not always necessary because the product will be heated during use.

Vanadium oxide or magnesium oxide contained in the catalyst tends to react with $SO_x$ contained in exhaust gases to the corresponding sulfates. Accordingly, although vanadium or magnesium initially exists as an oxide, it sometimes changes gradually to a sulfate. Such a change to a sulfate does not completely decrease the activity of the catalyst, but results in maintaining the catalyst at a fixed activity level determined depending upon the concentration of $SO_x$ and the reaction temperature. Titanium oxide and tungsten oxide are not easily converted to sulfates as is vanadium or magnesium, but are slightly converted to sulfates when exposed to exhaust gases containing $SO_3$ in a very high concentration at a relatively low temperature. The present invention encompasses such a state, too.

As described in the above-cited Japanese patent application Ser. No. 71102/1979 and Japanese Laid-Open Patent Publication No. 128681/1975, the composition of the mixture of titanium (component A) and tungsten and/or magnesium (component B) serving as the substrate is preferably as follows (atomic percent).

| | |
|---|---|
| Ti | 50–99% |
| W | 0–50% |
| Mg | 0–30% |
| W + Mg | 1–50% |

In preparing the substrate, the mixture is usually calcined at 300° to 800° C.

By adding tungsten and/or magnesium to titanium, the heat resistance of the catalyst is enhanced, and good results are obtained also in increasing the denitrating activity and decreasing its $SO_2$ oxidation activity.

The amount of vanadium supported and the state of its existence are the subject-matter of the present invention.

The vanadium compound is present in a concentration of 0.1 to 15% by weight in that area of the molded article which extends inwardly from the outermost surface of the molded article to a depth of not more than 500 microns.

If the vanadium compound is present in a deeper portion beyond 500 microns from the outermost surface of the molded article, the $SO_2$ oxidizing activity of the catalyst increases without an increase in the ratio of denitration.

In an area within 500 microns, the presence of the vanadium compound is important. If it is present in too narrow an area, for example in an area 1 micron deep from the outermost surface of the molded article, denitration ratios sufficient for practical purposes cannot be obtained.

Preferably the area in which the vanadium compound is present ranges inwardly from the outermost surface of the molded article to a depth of at least 30 microns, particularly at least 50 microns.

The presence of the vanadium compound can be ascertained by an X-ray microanalyzer. As shown in FIG. 1, it is usual that there is a gradient in concentration from the surface toward the center of the molded article. The above limitation means that the point where this gradient is substantially absent and the concentration of the vanadium compound is substantially zero is not more than 500 microns away from the outermost surface of the molded article.

The amount of the vanadium compound present, calculated as vanadium pentoxide, should be 0.1 to 15% by weight, preferably 0.3 to 6% by weight, in this particular area. If it is less than 0.1% by weight, sufficient denitrating activity cannot be obtained. If it is more than 15%, the activity of the catalyst in the oxidation of $SO_2$ increases without an increase in denitrating activity. The amount of the vanadium compound in the above area is calculated by measuring the amount of V in the entire catalyst by atomic absorptiometry, etc. and then calculating for the volumetric ratio of that area.

The shape of the catalyst is not particularly limited, and it may be obtained in various shapes such as honeycombs, pellets, macaronis, plates, and pipes.

The catalyst of the invention contains the three essential metallic components A, B and C. If desired, it may further contain a small amount (for example, a total amount of not more than 5% by weight, preferably not more than 4% by weight, based on the total weight of the elements A, B and C) of Be, Ca, Sr, Ba, B, Ga, In, Tl, Ge, Pb, As, Sb, Bi, Y, Ta, Cr, Mn. Zn, Cd, Ag, Cu and rare earth metals. It may contain alkali metals in an amount of not more than 1% by weight on the same basis.

It may also contain a considerably large amount (not more than 10% by weight on the same basis as an oxide or sulfate) of Al, Si, Sn, P, Zr, Nb, Mo, Fe, Co and Ni.

The catalyst composition of this invention can be used as supported on a carrier which is inert or has very low activity, such as silica, alumina, silica-alumina, diatomaceous earth, acid clay, active clay, porcelains, ceramics, zeolite, and pigment-grade titanium dioxide.

The following examples illustrate the present invention.

EXAMPLE 1

A 300-liter kneader was charged with 231.79 kg of hydrous titanic acid ($TiO_2$ 30.2% by weight), a raw material for pigment-grade titanium dioxide. It was neutralized with 30 liters of 15% aqueous ammonia and well mixed. Then, 5.928 kg of ammonium paratungstate ($WO_3$ 88.88% by weight) was dissolved in 100 liters of hot water, and the solution was added to the above mixture. As a molding aid, 700 g of polyethylene oxide was added. With good kneading, the mixture was heated to evaporate off the water until a water content suitable for molding was attained. The mixture was then molded by an extrusion molding machine into a honeycomb structure having a square cross section measuring 150 mm × 150 mm, an opening size of 6 × 6 mm and a wall thickness of 1.5 mm. The honeycomb structure was dried at 80° C. for 12 hours, and calcined at 500° C. for 5 hours to form a substrate.

The substrate was completely dipped in a bath of monoethanolamine, and dried. Then, it was dipped for 10 minutes in a solution of vanadyl oxalate in a concentration of 4.2% by weight as $V_2O_5$, dried at 110° C. for 12 hours, and then calcined at 500° C. for 5 hours (93 parts of $TiO_2$, 7 parts of $WO_3$).

The concentration distribution of vanadium (V) of this catalyst determined by an X-ray microanalyzer is shown in FIG. 1 of the accompanying drawings. It is seen from FIG. 1 that V was distributed on the surface portion to a depth of about 100 microns. Atomic absorptiometry showed that the amount of $V_2O_5$ in the catalyst was 0.2% by weight.

Since the wall thickness of the honeycomb structure was 1.5 mm, the average concentration of $V_2O_5$ in the $V_2O_5$-containing area was 1.5% by weight $$\left( 0.2 \times \frac{1500}{100 \times 2} \right).$$

This catalyst is designated as "catalyst A".

COMPARATIVE EXAMPLE 1

A substrate composed of titanium oxide and tungsten oxide was prepared by the same method as in Example 1, and put in a closed vessel. While evacuating the inside of the vessel to 700 mmHg, a solution of vanadyl oxalate in a concentration of 4.2% by weight as $V_2O_5$ was injected into the vessel. The substrate was completely dipped in the solution of vanadyl oxalate and maintained for 30 minutes. The solution was removed from the substrate, and the substrate was dried at 110° C. for 12 hours and then calcined at 500° C. for 3 hours.

The concentration distribution of V of this catalyst determined by X-ray microanalyzer is shown in FIG. 2 of the accompanying drawings. It is seen from FIG. 2 that the concentration of V was nearly uniform at every part ($V_2O_5$ concentration 1.5% by weight). The resulting catalyst is designated as "catalyst B".

COMPARATIVE EXAMPLE 2

A catalyst not containing tungsten oxide was prepared in the same way as in Example 1. The concentration distribution of V in this catalyst determined by an X-ray microanalyzer was substantially the same as in FIG. 1. The resulting catalyst is designated as "catalyst C".

EXAMPLE 2

A catalyst composed of a honeycomb structure consisting of 97 parts by weight of $TiO_2$ and 3 parts by weight of MgO and $V_2O_5$ present in the surface area of the honeycomb structure was prepared in the same way as in Example 1 except that magnesium nitrate was used instead of ammonium paratungstate. The concentration distribution of V in this catalyst was substantially the same as in FIG. 1. The resulting catalyst is designated as "catalyst D".

EXAMPLE 3

A catalyst composed of a honeycomb structure consisting of 92 parts by weight of $TiO_2$, 2 parts by weight of MgO and 3 parts by weight of $WO_3$ and $V_2O_5$ present in the surface portion of the honeycomb structure was prepared in the same way as in Examples 1 and 2. The concentration distribution of V in this catalyst was substantially the same as in FIG. 1. This catalyst is designated as "catalyst E".

COMPARATIVE EXAMPLE 3

A honeycomb structure consisting of 93 parts by weight of titanium oxide and 7 parts by weight of tungsten oxide was prepared in the same way as in Example 1 except that the vanadium compound was not used. The resulting structure is designated as "catalyst F".

COMPARATIVE EXAMPLE 4

A catalyst was prepared in the same way as in Example 1 except that the content of $V_2O_5$ in the area in which it was present was 20%. This catalyst is designated as "catalyst G". The state of existence of V was similar to that in FIG. 1, but the area in which V existed extended to a depth of about 400 microns.

COMPARATIVE EXAMPLE 5

A catalyst composed of $TiO_2$-$V_2O_5$ and $WO_3$ present on in surface portion thereof was prepared in the same way as in Example 1 of Japanese Laid-Open Patent Publication No. 3872/1980. The resulting catalyst is designated as "catalyst H".

Tests for evaluation of the activities of catalysts

1. Denitration ratio
Measured under the following conditions.
Catalyst specimen: a honeycomb sample containing four 6×6 mm square holes in the shape of crisscross in a square and having a wall thickness of 1.5 mm and a length of 100 mm.
Feed gas composition:

| NO | 350 ppm |
|---|---|
| $NH_3$ | 500 ppm |
| $SO_2$ | 250 ppm |
| $H_2O$ | 4.1% |
| $O_2$ | 1.9% |
| $N_2$ | remainder |

Flow rate of the feed gas: 200 liters/hour (passed through the holes alone)
Reaction time: Data after the 30-hour reaction were taken.

2. $SO_2$ oxidation ratio
Measured under the following conditions.
Catalyst sample: the same as in the measurement of the denitration ratio.
Feed gas composition:

| $SO_2$ | 700 ppm |
|---|---|
| $O_2$ | 5% |
| $N_2$ | remainder |

Flow rate of the feed gas: 50 liters/hour (passed through the holes alone)
Reaction time: Data after the 30-hour reaction were taken.

3. NO conversion
The amounts of NO at the inlet and outlet were analyzed by a $NO_x$ analyzer (Model 251 $NO/NO_x$ Analyzer, a product of Toshiba-Beckmann Co., Ltd.), and the NO conversion was calculated in accordance with the following equation.

$$NO\ conversion = \frac{(NO\ at\ the\ inlet) - (NO\ at\ the\ outlet)}{NO\ at\ the\ inlet} \times 100$$

4. $SO_2$ oxidation ratio
$SO_3$ formed by the oxidation of $SO_2$ by a heating sodium chloride method was measured in accordance with the method of Yoshimori et al. [Takayoshi Yoshimori and Makoto Nonomura, JAPAN ANALYST 23, 356 (1974)]. Total $SO_2$ was measured by absorption in hydrogen peroxide and titration with sodium hydroxide. The $SO_2$ conversion was calculated in accordance with the following equation.

$$SO_2\ oxidation\ ratio = \frac{SO_3\ formed}{Total\ SO_2} \times 100$$

The catalysts A to G were tested by the above methods, and the results are shown in Table 1.

TABLE 1

| | Item | | |
|---|---|---|---|
| | Denitration ratio (%) | | $SO_2$ oxidation ratio (%) |
| | Reaction temperature | | |
| Catalyst | 340° C. | 390° C. | 450° C. |
| A (Example 1) | 83.5 | 88.5 | 1.2 |
| B (Comp. Example 1) | 82.5 | 89.0 | 8.0 |
| C (Comp. Example 2) | 81.5 | 85.5 | 1.8 |
| D (Example 2) | 82.7 | 87.5 | 1.2 |
| E (Example 3) | 83.5 | 88.5 | 1.2 |
| F (Comp. Example 3) | 51 | 65 | 0 |
| G (Comp. Example 4) | 80 | 86 | 50.0 |
| H (Comp. Example 5) | 82 | 87 | 4.0 |

When the catalysts A, C, D and E were each tested for denitration ratios at a reaction temperature of 390° C. for 1000 hours, the following denitration ratios were obtained.
Catalyst A: 88%
Catalyst C: 77%
Catalyst D: 87%
Catalyst E: 88%

What we claim is:
1. A denitration catalyst for a waste gas containing nitrogen oxides and sulfur dioxide comprising at least three metal components, (A) titanium, (B) tungsten and/or magnesium, and (C) vanadium, the titanium and tungsten being contained as oxides and the magnesium and vanadium being contained in the form of an oxide or a sulfate or both, said catalyst being composed of a porous molded article of a mixture of an oxide of titanium as component A and at least one member of the group consisting of an oxide of tungsten, an oxide of magnesium and a sulfate of magnesium as component B, the atomic ratio of component B to component A being from 0.01 to 1, and a vanadium compound localized in that area of said molded article which extends from its outermost surface to a depth of 500 microns or less, the content of the vanadium compound in said area being 0.1 to 15% by weight.

2. The catalyst of claim 1 wherein the content of the vanadium compound is 0.3 to 6% by weight.

3. The catalyst of claim 1 wherein the vanadium compound is localized in an area extending from the outermost surface of said molded article to a depth of at least 30 microns.

4. The catalyst of claim 3 wherein the depth is at least 50 microns.

5. A method of removing nitrogen oxides from a waste gas, which comprises contacting a waste gas containing nitrogen oxides and sulfur dioxide, together with ammonia and molecular oxygen, at a temperature of 150° to 650° C., with a catalyst comprising at least three metal components, (A) titanium, (B) tungsten and/or magnesium and (C) vanadium, the titanium and tungsten being contained as oxides and the magnesium and vanadium being contained in the form of an oxide or a sulfate or both, said catalyst being composed of a porous molded article of a mixture of an oxide of titanium as component A and at least one member of the group consisting of an oxide of tungsten, an oxide of magnesium and a sulfate of magnesium as component B, the atomic ratio of component B to component A being from 0.01 to 1, and a vanadium compound localized in that area of said molded article which extends from its outermost surface to a depth of 500 microns or less, the content of the vanadium compound in said area being 0.1 to 15% by weight.

* * * * *